(12) United States Patent
Kaneko

(10) Patent No.: US 6,351,098 B1
(45) Date of Patent: Feb. 26, 2002

(54) CHARGING RECEPTACLE

(75) Inventor: Masaaki Kaneko, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/672,320

(22) Filed: Sep. 28, 2000

(30) Foreign Application Priority Data

Oct. 5, 1999 (JP) .............................. 11-284814

(51) Int. Cl.⁷ .................................................. H02J 7/00
(52) U.S. Cl. ...................................................... 320/108
(58) Field of Search ....................................... 320/108

(56) References Cited

U.S. PATENT DOCUMENTS

| | | | |
|---|---|---|---|
| 5,216,402 A | 6/1993 | Carosa | 336/66 |
| 5,264,776 A | 11/1993 | Hulsey | 320/108 |
| 5,477,122 A * | 12/1995 | Hall et al. | 320/108 |
| 5,821,731 A * | 10/1998 | Kuki et al. | 320/108 |
| 5,850,135 A * | 12/1998 | Kuki et al. | 320/108 |
| 6,049,191 A * | 2/1999 | Terazoe et al. | 320/108 |
| 6,127,799 A * | 5/1999 | Krishnan | 320/108 |

* cited by examiner

Primary Examiner—Peter S. Wong
Assistant Examiner—Pia Tibbits
(74) Attorney, Agent, or Firm—Morgan & Finnegan, LLP

(57) ABSTRACT

An electromagnetic induction type connection terminal for connecting a power supply station with a battery for charging the battery has a charging paddle and a charging receptacle. The charging paddle has a primary coil that is supplied with a current from the power supply station. The charging receptacle has a secondary coil connected to the battery. When the primary coil is supplied with a current from the power supply station with the charging paddle plugged into the charging receptacle, an electromotive force is induced into the secondary coil. The charging receptacle has an enclosure for accommodating the secondary coil. The enclosure forms a shield against electromagnetic waves. The charging receptacle has a communication unit for communicating information with the charging paddle to control the charging. The communication unit is located within the enclosure.

15 Claims, 5 Drawing Sheets

CHARGING RECEPTACLE

BACKGROUND OF THE INVENTION

The present invention relates to a charging receptacle for use in an induction type charging apparatus for charging a battery of an electric vehicle or the like.

Conventionally, a conduction type charging apparatus and an induction type charging apparatus have been utilized for charging batteries of electric vehicles. The conduction type charging apparatus has a contact type connection terminal for directly connecting a power supply positioned external to a vehicle with a battery equipped in the vehicle. In contrast, the induction type charging apparatus has a non-contact type connection terminal for connecting a power supply with a battery through electromagnetic induction. The induction type charging apparatus is less susceptible to a contact failure. In addition, the induction type charging apparatus is smaller than the conduction type charging apparatus, so the induction type charging apparatus has drawn particular attention in recent years.

FIG. 5 illustrates a connection terminal of a conventional induction type charging apparatus. The connection terminal has a charging paddle 61, and a charging receptacle 71 for receiving the charging paddle 61. The charging paddle 61 is connected to a cable 62 extending from an external power supply station (not shown). The charging receptacle 71 is equipped in an electric vehicle, and connected to a battery also equipped in the vehicle.

The charging receptacle 71 has an enclosure 75, an inserting hole 72 formed through the enclosure 75, a power receiving core 73 accommodated in the enclosure 75, and a power receiving coil 74 contained in the enclosure 75 and wound around the power receiving core 73. For reducing the time required for charging, i.e., for achieving rapid charging, some charging apparatuses for electric vehicles use high frequencies and high power. For example, a charging apparatus that uses 430 volts and high frequencies (100 kHz to 370 kHz) to produce power of 80 kilowatts has been developed. In regard to this type of charging apparatus, the charging receptacle 71 is accommodated in the enclosure 75, which is shielded against the noise to prevent external noise of radio waves, electromagnetic waves and so on from entering the connection terminal, and to prevent emission of noise due to a large current at a high frequency handled by the connection terminal itself.

The charging paddle 61 has an distal end 63, which contains a power transmitting core 64 and a power transmitting coil 65 wound around the power transmitting core 64. For supplying power, the charging paddle 61 is inserted into an inserting hole 72 of the charging receptacle 71 to place the power transmitting coil 65 upon the power receiving coil 74. Then, the power supply station passes a current (alternate current) through the power transmitting coil 65 to induce power in the power receiving coil 74.

A plurality of ventilation holes 76 are formed around the inserting hole 72 of the enclosure 75 of the charging receptacle 71 for introducing external air. When heat is generated during charging from the power transmitting coil 65 of the charging paddle 61 and the power receiving coil 74 of the charging receptacle 71, external air is introduced through the holes 76, and is exhausted to the outside by a cooling fan 77 on the opposite side of the enclosure 75. In this way, the heat is discharged to the outside.

The charging apparatus also includes an interlock function for starting conduction after confirming that the charging paddle 61 is securely inserted into the charging receptacle 71; a function of determining a charging rate (power value) from a power supply station external to the vehicle based on a vehicle determination such as the voltage of an on-vehicle battery or the like; and a function of charging while monitoring condition such as the liquid temperature of the on-vehicle battery. Suitable charging conditions are set through communications of information between the vehicle and the external power supply station. Consequently, the power supply station external to the vehicle supplies appropriate power for the preferred charging conditions to the power transmitting coil 65 of the charging paddle 61 through the cable 62.

The transmission and reception of the information are performed by a communication unit 78 attached on the enclosure 75 of the charging receptacle 71 and a communication unit 66 contained in the charging paddle 61 through wireless communications. The communication unit 78 is accommodated in a noise shielded case 79 for preventing malfunctions due to radio waves of portable telephones or other devices.

However, due to the structure in which the communication unit 78 is accommodated in the case 79 attached on the enclosure 75 of the charging receptacle 71, the resultant charging receptacle 71 is large. This is a problem for electric vehicles, which are required to be smaller.

In addition, a space must be provided for insulation between the noise shielded case 79 of the communication unit 78 and a current-carrying part of a communication circuit. This also increases the size of the communication unit 78.

During charging, the power receiving coil 74 and the power transmitting coil 65 generate heat. Then, the heat is conducted from the enclosure 75 of the charging receptacle 71 to the communication unit 78 carried on the enclosure 75 of the charging receptacle 71 to elevate the temperature of the communication unit 78. As a result, the communication unit 78 become unstable due to the elevated temperature, particularly when the atmospheric temperature is high as in summer.

Also, for securely inserting the charging paddle 61 into the charging receptacle 71 when the battery is charged, guiding members (not shown) must be formed on the top and bottom within the inserting hole 72 of the enclosure 75 of the charging receptacle 71. The formation of the guiding members also increases manufacturing costs.

Moreover, the enclosure 75 of the charging receptacle 71 is loaded with the weight of such parts as the power receiving core 73 of the charging receptacle 71 accommodated therein, the power receiving coil 74, the cooling fan 77, and other parts. Also, when the charging paddle 61 is inserted into the enclosure 75, and the enclosure 75 is required to have strength enough to withstand this weight. In addition, an operator may inadvertently twist the charging paddle 61 when inserting or removing the charging paddle 61, so the enclosure 75 is also required to withstand such torsion. It is therefore necessary to form the enclosure 75 of a strong material, thereby increasing manufacturing costs.

The communication units 66, 78 used in the charging paddle 61 and the charging receptacle 71 wirelessly communicate with each other. The frequency band of radio waves available to the wireless communication differs from one country or area (zone) to another. Therefore, for commercializing the charging paddle 61 and the charging receptacle 71, a plurality of different types must be manufactured to adapt to the available frequency bands in respective countries and areas. Thus, the provision of a large number of types increase the manufacturing costs of the charging receptacle 71.

SUMMARY OF THE INVENTION

It is an object of the present invention to provide a charging receptacle which is capable of maintaining a good shielding capability against electromagnetic noise while reducing the size.

It is another object of the present invention to provide a charging receptacle which is manufactured at a low cost.

To achieve the above objectives, the present invention provides a charging receptacle for an electromagnetic induction type connection terminal for connecting a power supply station with a battery for charging the battery. The connection terminal has a charging paddle that plugs into the charging receptacle. The charging paddle has a primary coil supplied with a current from the power supply station. The charging receptacle includes a secondary coil connected to the battery, an enclosure for accommodating the secondary coil, and a communication unit for communicating information with the charging paddle to control the charging. The secondary coil produces an inductive electromotive force when the primary coil is supplied with current from the power supply station and when the charging paddle is plugged into the charging receptacle. The enclosure forms a shield against electromagnetic waves. The communication unit is within the enclosure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawing in which.

DETAILED DESCRIPTION OF THE PREFERRED EMBODIMENTS

Figure 2:
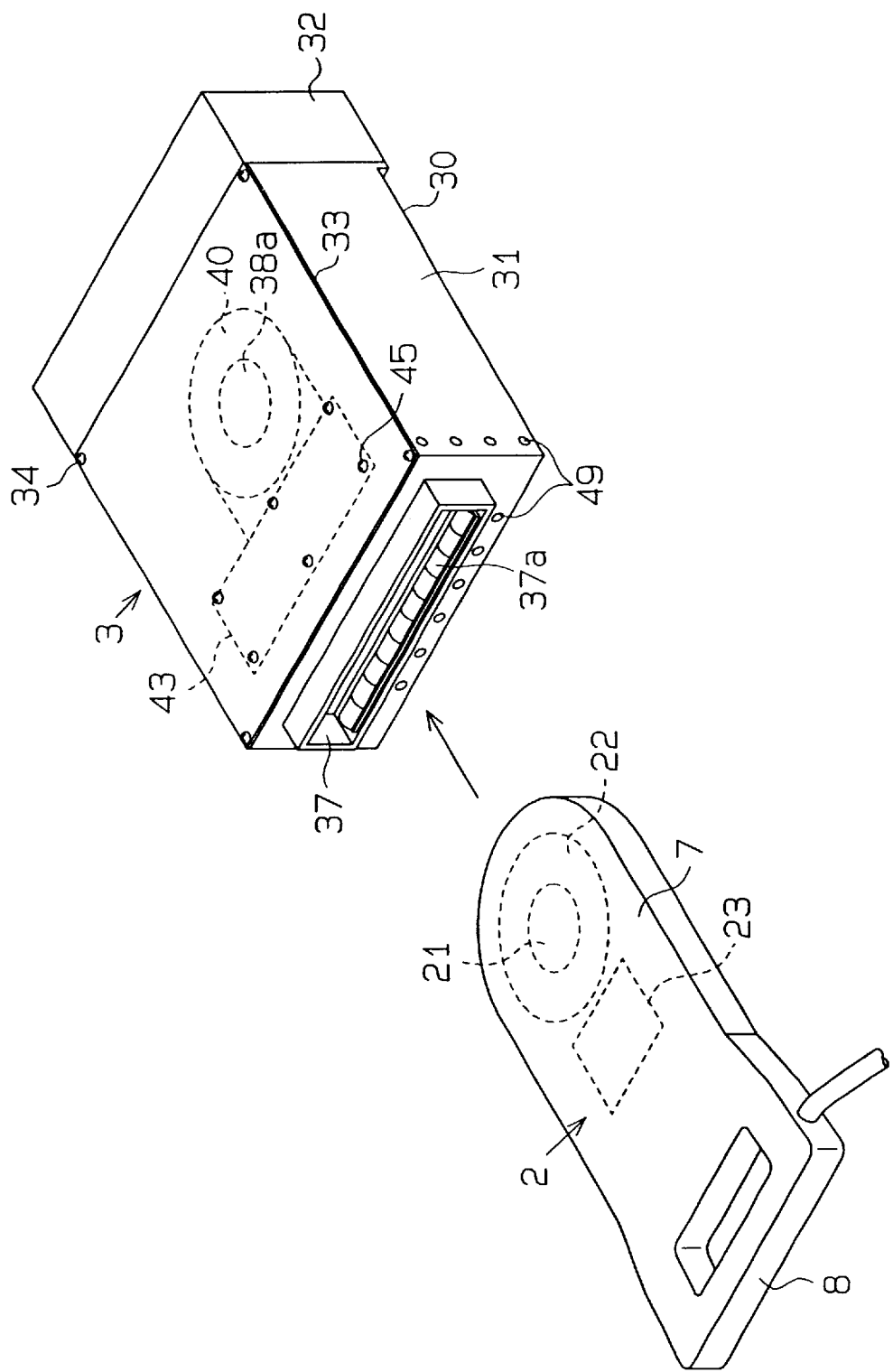
FIG. 2 is a perspective view illustrating a connection terminal which comprises a charging paddle and a charging receptacle according to the present invention.
Figure 3:
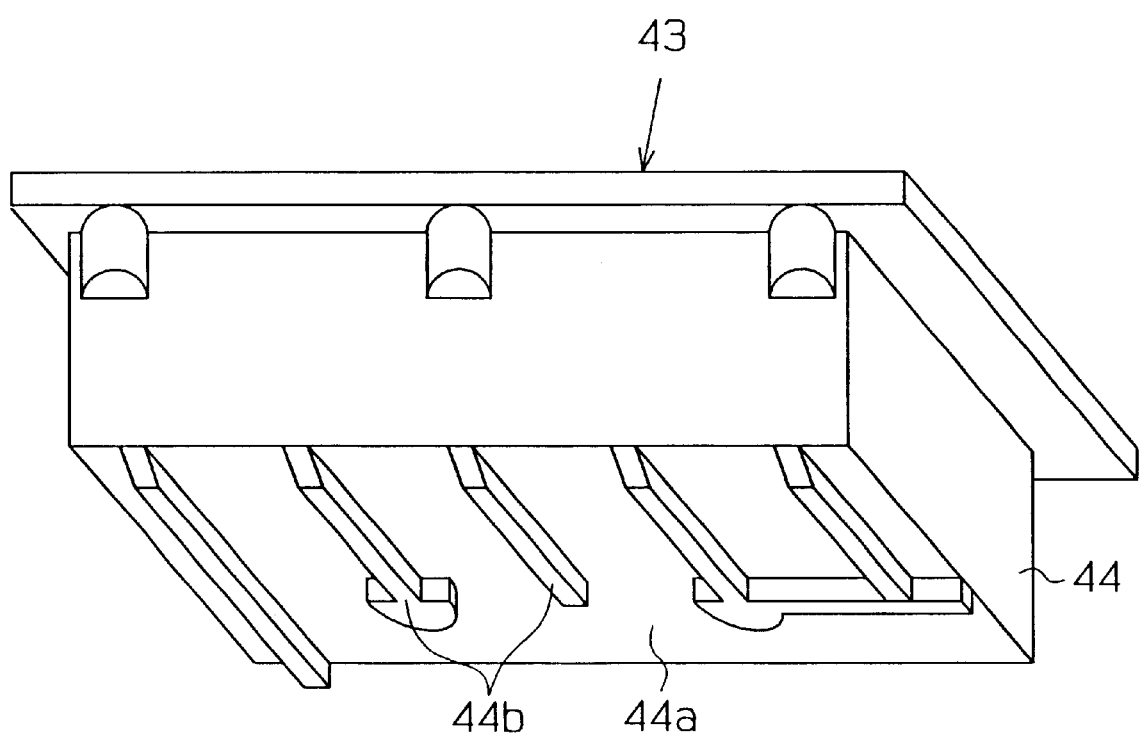
FIG. 3 is a perspective view illustrating a communication case for a communication unit.
Figure 4:
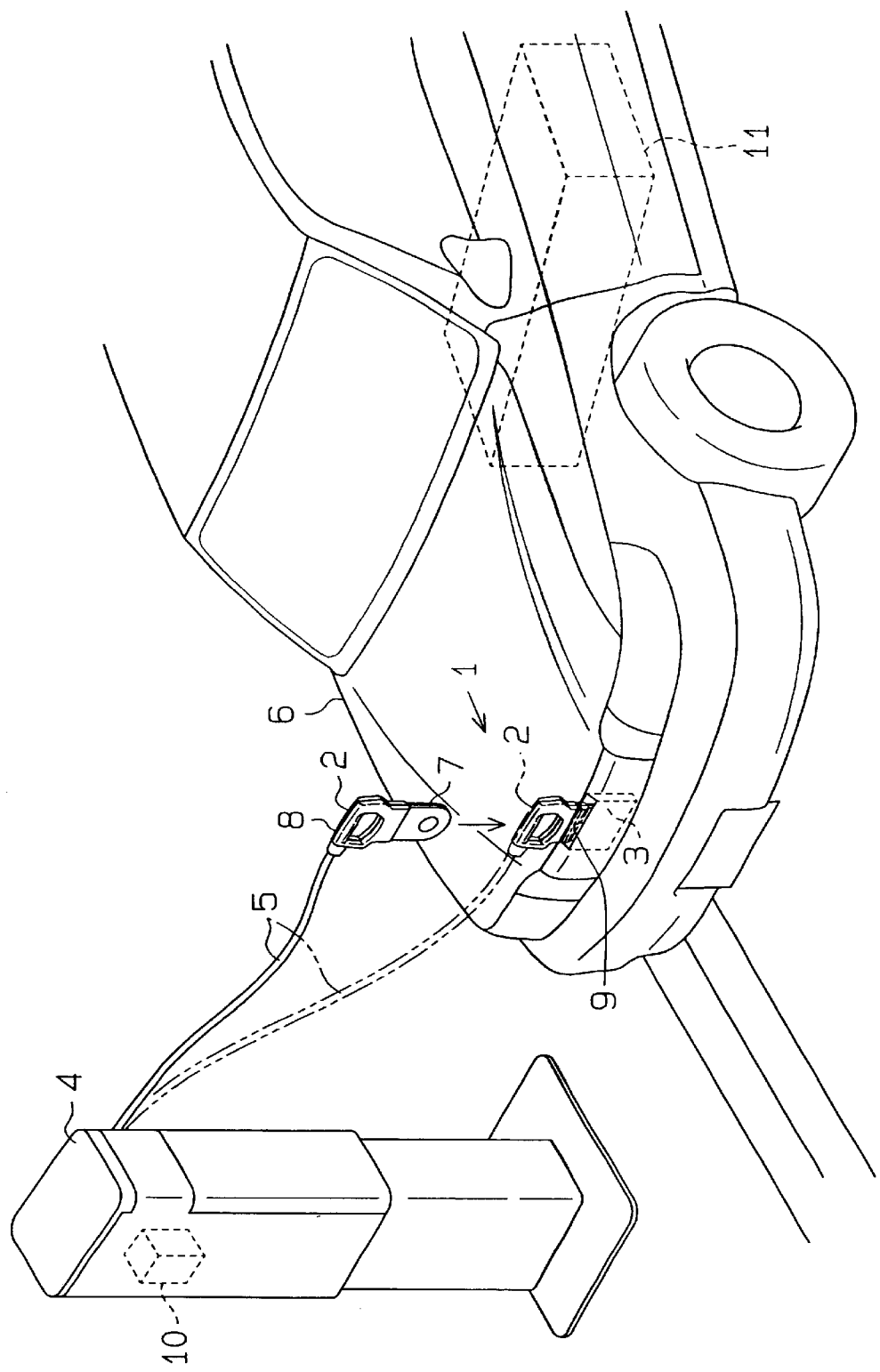
FIG. 4 is a perspective view illustrating the configuration of an induction type charging apparatus according to the present invention.
Figure 5:
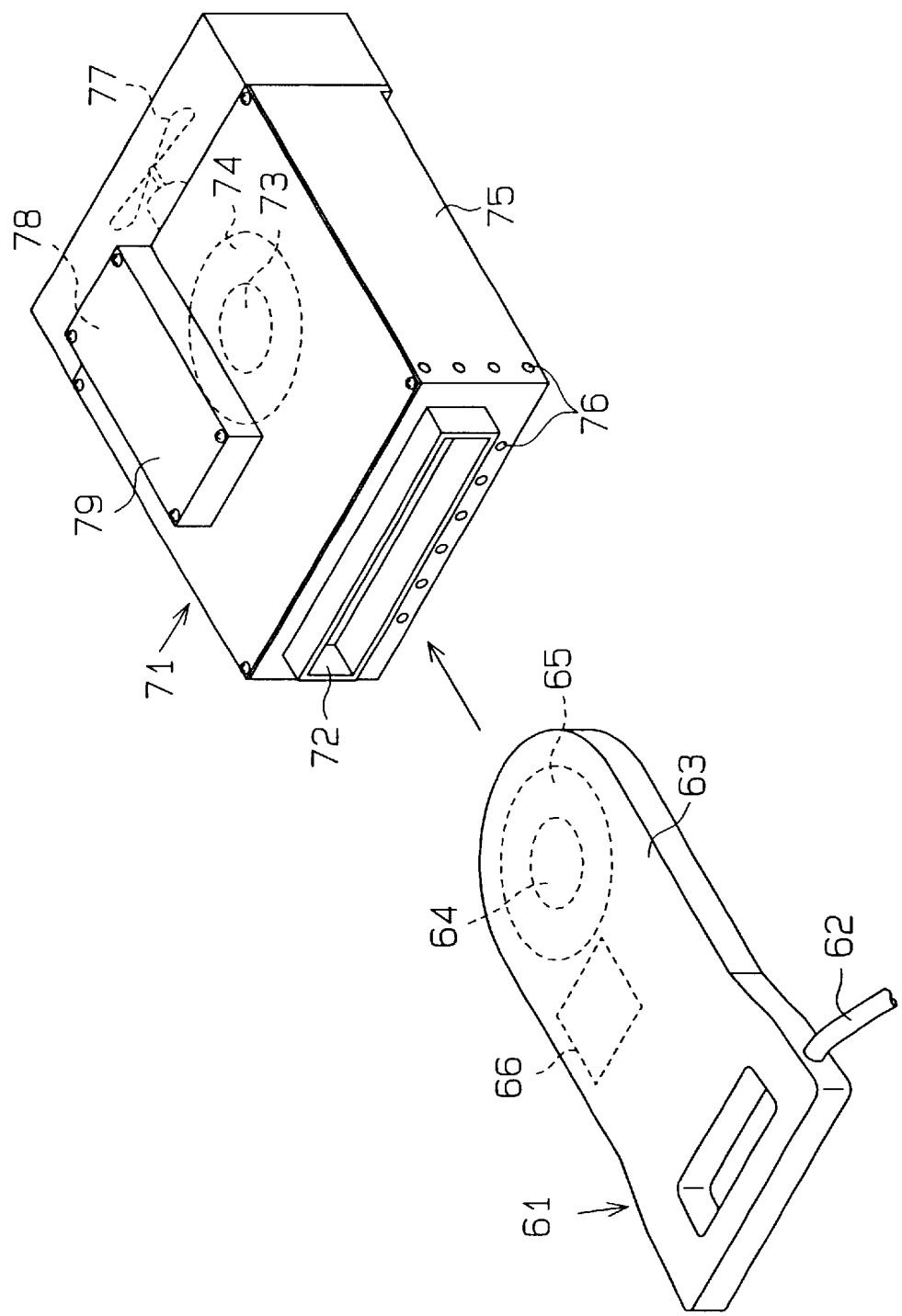
FIG. 5 is a perspective view illustrating a connection terminal of a conventional induction type charging apparatus.

An induction type charging apparatus according to one embodiment of the present invention will hereinafter be described with reference to FIGS. 1 to 4. As illustrated in FIG. 4, the induction type charging apparatus 1 has a connection terminal that includes a charging paddle 2 and a charging receptacle 3 for receiving the charging paddle 2. A cable 5 extends from a power supply station 4. The charging paddle 2 is attached to the distal end of the cable 5. The charging receptacle 3 is located at a predetermined position within an electric vehicle 6 (for example, in front of a hood as shown in FIG. 4), and connected to a battery 11 also located in the electric vehicle 6.

The charging paddle 2 has an distal end 7 and a grip 8. The distal end 7 can be inserted into and removed from a socket 9 of the charging receptacle 3. The distal end 7 has a front surface and a back surface that have the same shape. Therefore, the distal end 7 can be plugged into the charging receptacle 3 when the distal end 7 is facing either front or back.

For charging the electric vehicle 6, the distal end 7 of the charging paddle 2 is plugged into the socket 9 of the charging receptacle 3, as indicated by broken lines in FIG. 4. An alternating current of a predetermined value is sent from the power supply station 4 to the charging paddle 2 through the cable 5. The alternating current is received by the charging receptacle 3 through electromagnetic induction to charge the battery 11 equipped in the electric vehicle 6.

This non-contact charging apparatus 1 comprises an interlock function for starting conduction after confirming that the charging paddle 2 is securely inserted into the charging receptacle 3; a function of determining a charging rate (power value) from the power supply station 4 external to the vehicle based on a vehicle determination such as the voltage of the battery 11 or the like; and a function of charging while monitoring conditions such as the liquid temperature of the battery 11. A controller 10 located in the power supply station 4 sets suitable charging conditions through communication of information between the vehicle and the external power supply station 4. Consequently, the power supply station 4 supplies appropriate power for preferred charging conditions to the charging paddle 2 through the cable 5.

Figure 1:
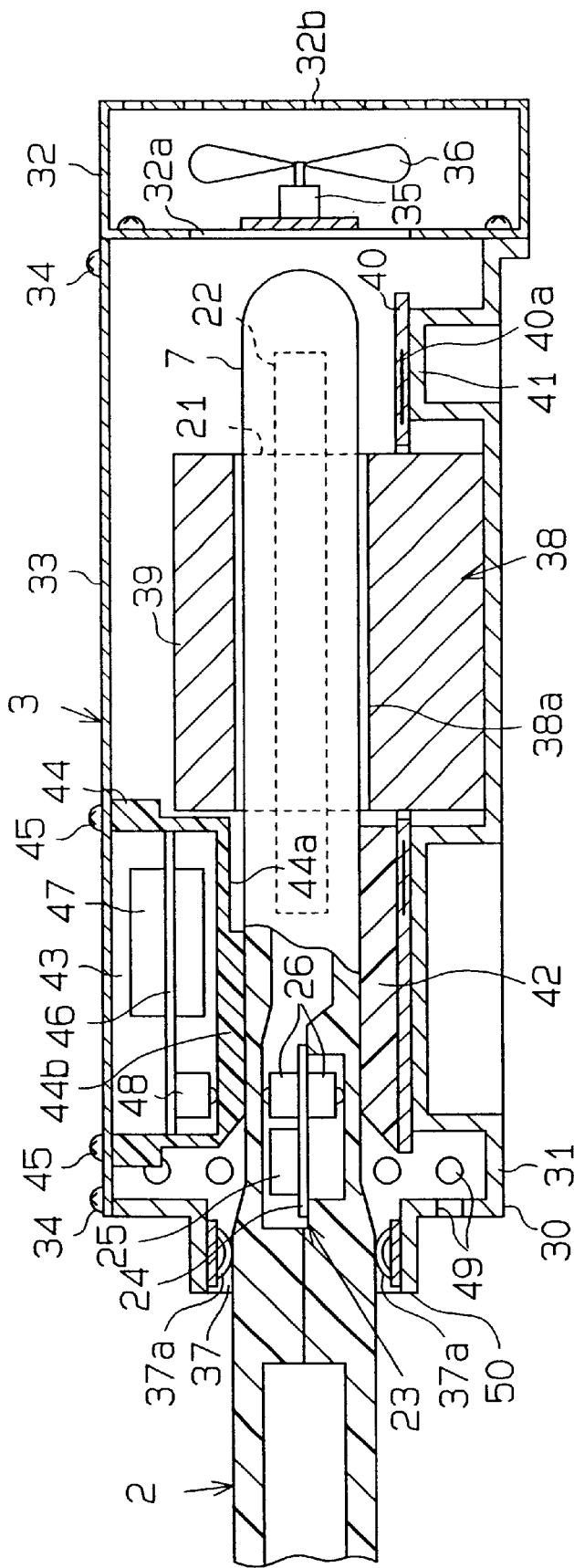
FIG. 1 is a cross-sectional view illustrating how a charging paddle is inserted in a charging receptacle, for explaining one embodiment of the present invention.

The structure of the charging paddle 2 will be described. FIG. 1 is a cross-sectional view illustrating how the charging paddle 2 is inserted in the charging receptacle 3. FIG. 2 is a perspective view illustrating the connection terminal, which includes the charging paddle 2 and the charging receptacle 3. In FIG. 2, the charging paddle 2 has the distal end 7, which includes a substantially cylindrical primary core 21 made of ferrite and a primary coil 22 wound around the primary core 21. The primary coil functions as a power transmitting coil. The charging paddle 2 also has a grip 8 and contains a communication unit 23 within the distal end 7 between the vicinity of the grip 8 and the primary coil 22.

As illustrated in FIG. 1, the communication unit 23 has a communication circuit 25 including a plurality of circuit elements mounted on a substrate 24. An infrared sensor 26 is located on each of a front surface and a back surface (the top and the bottom in FIG. 1) of the substrate 24. The charging paddle 2 communicates information with the charging receptacle 3 through the infrared sensors 26. The infrared sensors 26 are located on the front surface and the back surface of the substrate 24 so that information can be communicated whether the charging paddle 2 is facing frontward or backward when it is plugged into the charging receptacle 3. A jacket of the charging paddle 2 is formed of infrared-transparent resin, which readily transmits infrared rays for permitting the communication of information with the charging receptacle 3 through the infrared sensors 26.

The structure of the charging receptacle 3 will be described. As illustrated in FIG. 2, the charging receptacle 3 has an enclosure 30, which is attached to the electric vehicle 6. The enclosure 30 has a main case 31, and a fan container 32 and a lid 33 coupled to the main case 31. In this embodiment, the main case 31 is formed of aluminum. Two side surfaces of the main case 31 (the right side and the upper side in FIG. 1) are open. In the right side opening of the main case 31, the fan container 32, which is made of iron, is fixed to the main case 31. In the upper side opening of the main case 31, a plate-like lid 32, which is made of iron, is secured to the main case 31 with screws 34. A motor 35 and a fan 36 rotated by the motor 35 are located in the fan container 32.

Also, in FIG. 1, an outwardly extending hollow guide 50 is formed on the left side of the main case 31. A port 37 is formed at the outer end of the guide 50 for receiving the charging paddle 2. The guide 50 has a rectangular cylindrical shape. The distal end 7 of the charging paddle 2 is inserted into the guide 50 through the port 37, and is guided into a space within the enclosure 30. In other words, the charging paddle 2 is plugged into the charging receptacle 3 through the port 37.

A plurality of guiding springs 37a are located on upper and lower inner surfaces of the guide 50. The guiding springs 37a, which are formed of curved copper plates, extend in the width direction of the enclosure 30. As illustrated in FIG. 1, when the charging paddle 2 is fully plugged into the charging receptacle 3, the guiding springs 37a urge the jacket of the charging paddle 2 from both sides. In this embodiment, conductive particles are impregnated in an outer peripheral portion, including the jacket, of the charging paddle 2 that contains the guiding springs 37a. Thus, the outer peripheral portion is electrically conductive.

A first core 38 and a second core 39, both made of ferrite, are located in the enclosure 30. The first core 38 has a central protrusion 38a, which is designed such that the distal end 7 of the charging paddle 2 can pass through a space between the protrusion 38a and the second core 39 when the charging paddle 2 is plugged in. As illustrated in FIG. 1, when the charging paddle 2 is fully plugged in, the central protrusion 38a opposes the primary core 21 of the charging paddle 2.

A coil substrate 40 is located around the central protrusion 38a. A plurality of secondary coils 40a are laminated on the coil substrate 40. The secondary coils 40a function as a power receiving coil. As illustrated in FIG. 1, the coil substrate 40 is supported by a base 41, which is formed by partially depressing the main case 31. Then, a plurality of guiding plates 42 are arranged on the top surface of a region of the coil substrate 40 near the port 37 along the direction in which the charging paddle 2 is inserted.

Opposite to the guiding plates 42, a communication case 44 for the communication unit 43 is secured on the inner side of the lid 33 by screws 45. Stated another way, the communication case 44 (communication unit 43) is placed at a position near the port 37 within the enclosure 30. As illustrated in FIG. 3, a plurality of guiding pieces 44b are arranged on a bottom surface 44a of the communication case 44 at predetermined intervals. The guiding pieces 44b function as guiding members formed to extend along the direction in which the charging paddle 2 is inserted. The guiding pieces 44b and the guiding plates 42, which are arranged on the coil substrate 40, smoothly guide the charging paddle 2.

A substrate 46 is located in the communication case 44. A communication circuit 47 including a plurality of circuit elements is mounted on the substrate 46. The substrate 46 is also provided with an infrared sensor 48. The infrared sensor 48 is placed such that the infrared sensor 48 opposes the infrared sensor 26 located on the communication unit 23 of the charging paddle 2 when the charging paddle 2 is fully inserted, as illustrated in FIG. 1. The communication case 44 is formed of a synthetic resin that has electrically insulating and infrared-transmission properties. Therefore, the communication unit 23 of the charging paddle 2 and the communication unit 43 of the charging receptacle 3 can communicate information through the infrared sensors 26, 48, respectively.

A plurality of ventilation holes 49 for permitting entry of external air are formed on each surface of the main case 31 near the inserting port 37. A passage 32a is formed through a surface of the fan container 32 close to the main case 31. An exhaust hole 32b is formed through a surface of the fan container 32 away from the main case 31. As the fan 36 is rotated by the motor 35, external air enters the enclosure 30 through the ventilation holes 49. The air is guided toward the fan container 32 through a gap between the guiding pieces 44b of the communication case 44 and a gap between the guiding plates 42. The external air enters the fan container 32 through the passage 32a, and is then exhausted to the outside through the exhaust port 32b.

In the present invention, the communication case 44 of the communication unit 43 is secured with screws 45 on the inner side of the lid 33. In other words, the communication case 44 (communication unit 43) is positioned within the enclosure 30. Thus, the communication unit 43 does not protrude, so that the charging receptacle 3 is reduced in size.

In addition, since the main case 31 is made of aluminum, while the fan container 32 and the lid 33 are made of iron, the charging receptacle 3 is strong.

The communication unit 43 is surrounded by metals, such as the aluminum main case 31 and the iron lid 33, which exhibit high shielding capabilities against electromagnetic noise. For this reason, the communication case 44 for the communication unit 43 need not function as a shield against electromagnetic noise, so that the communication case 44 can be formed of a synthetic resin. The use of synthetic resin reduces the weight of the communication case 44.

The communication unit 43 is positioned near the port 37. External air introduced through the ventilation hole 49 immediately passes by the communication case 44 of the communication unit 43, so that the communication unit 43 is efficiently cooled.

The communication case 44 for the communication unit 43 is formed of a synthetic resin having an electrically insulating property. This eliminates the need for a special insulating member exclusively for insulating between the communication unit 43 and the charging receptacle 3. Consequently, the number of parts and the number of assembling steps are reduced.

The guiding plates 42 are arranged on the coil substrate 40, and the guiding pieces 44b are arranged on the bottom surface 44a of the communication case 44. Therefore, the charging puddle 2 is smoothly guided along the guiding plates 42 and the guiding pieces 44b.

The guiding pieces 44b are formed integrally on the bottom surface 44a of the communication case 44, while the guiding plates 42 are integrally formed on the coil substrate 40. This eliminates the need for a special guiding member exclusively for guiding the charging paddle 2. Consequently, the number of parts and the number of assembling steps are reduced.

The communication units 23, 43 communicate with each other by infrared rays. The infrared-based communication can be defined in accordance with a common standard irrespective of countries and regions, unlike the radio wave communications which differ in available frequency band from one country or region to another. Since the communication units conform to a unified standard, the manufacturing cost is reduced.

A plurality of the guiding springs 37a made of copper plates are arranged in the port 37 in the width direction of the enclosure 30, and the outer peripheral portion including the jacket of the charging paddle 2 is electrically conductive.

Thus, when the charging paddle 2 is fully inserted, a reliable shield against electromagnetic noise is located between the port 37 and the charging coupler 2.

It should be apparent to those skilled in the art that the present invention may be embodied in many other specific forms without departing from the spirit or scope of the invention. Particularly, it should be understood that the invention may be embodied in the following forms.

The main case 31 may be formed of a metal other than aluminum such as iron or a synthetic resin that can shield electromagnetic noise and maintain rigidity.

The fan container 32 may be integrally formed with the main case 31 using the same material.

The lid 33 may be formed of a metal other than iron such as a aluminum or a synthetic resin that can shield electromagnetic noise and maintain rigidity.

The communication case 44 may be directly secured on the inner side of the main case 31 with fasteners such as screws.

The fan container 32 may be fixed on a surface of the main case 31 other than the side surface opposing the port 37 of the main case 31.

Between the communication case 44 and the communication unit 23 of the charging paddle 2, only those parts required for communications may be formed of an infrared-transmission synthetic resin, and those parts not involved in communications may be formed using an insulating silicone resin, epoxy resin, or ceramic.

While the communication case 44 is positioned near the port 37 of the main case 31, the communication case 44 may be located at another position such as near the fan container 32, as long as the position permits the communication unit 43 in the communication case 44 to communicate with the communication unit 23 of the charging paddle 2.

Other than inserting the charging paddle 2 into the charging receptacle 3, the charging paddle 2 may be coupled to the charging receptacle 3 in any way as long as the secondary coil 40a of the coil substrate 40 is positioned close to the primary coil 22 of the charging paddle 2.

The charging receptacle 3 may be applied to a charging receptacle of any charging apparatus for machines other than vehicles.

Therefore, the present examples and embodiments are to be considered as illustrative and not restrictive and the invention is not to be limited to the details given herein, but may be modified within the scope and equivalence of the appended claims.

What is claimed is:

1. A charging receptacle for an electromagnetic induction type connection terminal for connecting a power supply station with a battery for charging the battery, the connection terminal having a charging paddle that plugs into the charging receptacle, the charging paddle having a primary coil supplied with a current from the power supply station, the charging receptacle comprising:

a secondary coil connected to the battery, the secondary coil producing an inductive electromotive force when the primary coil is supplied with current from the power supply station and when the charging paddle is plugged into the charging receptacle;

an enclosure for accomodating the secondary coil, the enclosure forming a shield against electromagnetic waves;

a communication unit, located within the enclosure, for communicating information via infrared rays with the charging paddle to control the charging, wherein information is communicated when the charging paddle is plugged into the charging receptacle to enable power to be supplied; and a communication case located within the enclosure, the communication case being formed of an electrically insulative synthetic resin, wherein the case surrounds the communication unit.

2. The charging receptacle according to claim 1, wherein the enclosure includes a port for accepting the charging paddle and ventilation holes formed around the port, wherein a fan is provided on the opposite side of the enclosure with respect to the port, and the communication unit is positioned near the port.

3. The charging receptacle according to claim 2, wherein the communication case is formed of an electrically insulative synthetic resin.

4. The charging receptacle according to claim 3, wherein the communication case includes a guiding member for guiding the charging paddle into the enclosure.

5. The charging receptacle according to claim 1, wherein the communication case includes a guiding member for guiding the charging paddle into the enclosure.

6. The charging receptacle according to claim 1, wherein the enclosure is made of a metal having an electromagnetically shielding property.

7. A charging receptacle for an electromagnetic induction type connection terminal for connecting a power supply station with a battery for charging the battery, the connection terminal having a charging paddle that plugs into the charging receptacle, the charging paddle having a primary coil supplied with a current from the power supply station, the charging receptacle comprising:

a secondary coil connected to the battery, the secondary coil producing an inductive electromotive force when the primary coil is supplied with current from the power supply station and when the charging paddle is plugged into the charging receptacle;

an enclosure for accomodating the secondary coil, the enclosure forming a shield against electromagnetic waves, the enclosure including a main case having an opening and a lid covering the opening;

a communication unit, located within the enclosure, for communicating information via infrared rays with the charging paddle to control the charging wherein information is communicated when the charging paddle is plugged into the charging receptacle to enable power to be supplied; and a communication case located within the enclosure, the communication case being formed of an electrically insulative synthetic resin, wherein the case surrounds the communication unit.

8. The charging receptacle according to claim 7, wherein the enclosure includes a port for accepting the charging paddle and ventilation holes formed around the port, wherein a fan is provided on the opposite side of the enclosure with respect to the port, and the communication unit is positioned near the port.

9. The charging receptacle according to claim 8, further comprising a communication case located within the enclosure, the communication case being formed of a electrically insulative synthetic resin, wherein the case surrounds the communication unit.

10. The charging receptacle according to claim 7, wherein the communication case is attached to the lid.

11. The charging receptacle according to claim 9, wherein the communication case is attached to the lid.

12. The charging receptacle according to claim 9, wherein the communication case includes a guiding member for guiding the charging paddle into the enclosure.

13. The charging receptacle according to claim 9, wherein the communication case includes a guiding member for guiding the charging paddle into the enclosure.

14. The charging receptacle according to claim 7, wherein the main case and the lid are made of metal having electromagnetically shielding properties.

15. The charging receptacle according to claim 7, wherein the main case is formed with material that differs from, but maintains the same shielding properties with that of the lid.

* * * * *

UNITED STATES PATENT AND TRADEMARK OFFICE
CERTIFICATE OF CORRECTION

PATENT NO.    : 6,351,098 B1
DATED         : February 26, 2002
INVENTOR(S)   : Masaaki Kaneko It is certified that error appears in the above-identified patent and that said Letters Patent is hereby corrected as shown below:

<u>Column 2,</u>
Line 50, please delete "enclosure 75, and the enclosure" and substitute therefor
-- enclosure 75, the enclosure --;

<u>Column 6,</u>
Line 46, please delete "charging puddle 2" and substitute therefore -- charging paddle 2 --.

Signed and Sealed this

Fourth Day of June, 2002

Attest:

JAMES E. ROGAN
Attesting Officer          Director of the United States Patent and Trademark Office